US008606762B2

(12) United States Patent
Schreck et al.

(10) Patent No.: US 8,606,762 B2
(45) Date of Patent: Dec. 10, 2013

(54) DATA QUALITY ADMINISTRATION FRAMEWORK

(75) Inventors: Stefan Schreck, Oftersheim (DE); Arno Meyer, Saarbruecken (DE)

(73) Assignee: SAP AG, Walldorf (DE)

(*) Notice: Subject to any disclaimer, the term of this patent is extended or adjusted under 35 U.S.C. 154(b) by 871 days.

(21) Appl. No.: 12/211,369

(22) Filed: Sep. 16, 2008

(65) Prior Publication Data

US 2010/0070893 A1    Mar. 18, 2010

(51) Int. Cl.
*G06F 7/00*     (2006.01)
*G06F 17/00*    (2006.01)

(52) U.S. Cl.
USPC ........................................... 707/692

(58) Field of Classification Search
USPC .......... 707/692, 602, 705, 737, 769, 792, 803
See application file for complete search history.

(56) References Cited

U.S. PATENT DOCUMENTS

| | | | | |
|---|---|---|---|---|
| 6,668,253 | B1* | 12/2003 | Thompson et al. .................... 1/1 |
| 7,225,444 | B1* | 5/2007 | Yung et al. .................... 718/106 |
| 7,318,162 | B2* | 1/2008 | Rineer et al. .................... 713/193 |
| 2002/0103834 | A1* | 8/2002 | Thompson et al. .......... 707/526 |
| 2002/0198775 | A1* | 12/2002 | Ryan ................................ 705/14 |
| 2003/0083923 | A1* | 5/2003 | Guicciardi et al. ............... 705/9 |
| 2003/0158795 | A1* | 8/2003 | Markham et al. ............... 705/28 |
| 2004/0098358 | A1* | 5/2004 | Roediger ......................... 706/46 |
| 2004/0107202 | A1* | 6/2004 | Burdick et al. ............... 707/101 |
| 2004/0107386 | A1* | 6/2004 | Burdick et al. .................. 714/38 |
| 2004/0210454 | A1* | 10/2004 | Coughlin et al. .................. 705/1 |
| 2004/0230676 | A1* | 11/2004 | Spivack et al. ................ 709/223 |
| 2005/0171833 | A1* | 8/2005 | Jost et al. ........................ 705/10 |
| 2006/0294151 | A1* | 12/2006 | Wong et al. ................... 707/200 |
| 2007/0113191 | A1* | 5/2007 | Keller et al. ................... 715/752 |
| 2007/0162456 | A1* | 7/2007 | Agassi et al. .................... 707/10 |
| 2007/0179823 | A1* | 8/2007 | Bhaskaran et al. ............... 705/7 |
| 2007/0198312 | A1* | 8/2007 | Bagchi et al. ..................... 705/7 |
| 2008/0133960 | A1* | 6/2008 | Wong et al. ...................... 714/2 |
| 2008/0222630 | A1* | 9/2008 | Taylor et al. ................... 717/176 |
| 2008/0281907 | A1* | 11/2008 | Vieira ........................... 709/203 |
| 2008/0313024 | A1* | 12/2008 | Kunichika et al. ............. 705/11 |
| 2008/0313596 | A1* | 12/2008 | Kreamer et al. ............... 717/101 |
| 2010/0023362 | A1* | 1/2010 | Nguyen et al. .................... 705/7 |
| 2010/0161709 | A1* | 6/2010 | Fourman ....................... 709/203 |

\* cited by examiner

*Primary Examiner* — Robert Beausoliel, Jr.
(74) *Attorney, Agent, or Firm* — Brake Hughes Bellermann LLP

(57) ABSTRACT

A method of data quality management including selecting a task group wherein the task group comprises at least one data validation sub-task. In one embodiment, the method may also include arranging at least a portion of a master data into a validation group, wherein the validation group is associated with the task group. In various embodiments, the method may include, for each data validation sub-task, determining a sub-task type, validating the validation group as directed by the data validation sub-task, and calculating a set of key performance indicators (KPIs) associated with the data validation sub-task.

22 Claims, 8 Drawing Sheets

| BN | B | BP | BQ | BR | BS | B |
|---|---|---|---|---|---|---|
| ADDRESS-A | ADDF | ADDF | ADD | ADDRESS-C | ADDF | |
| 02 | | 85491 | X | | Hamburg | |
| 02 | | 704F4 | X | | | |
| 01 | | 0EC9 | X | | Walldorf | |
| 02 | | CA43 | X | | Hamburg | |
| 02 | | 9DE7 | X | | Frankfurt | |
| 02 | | 606B8 | X | | Frankfurt | |
| 02 | | 861B9 | X | | Frankfurt | |
| 03 | | 53E59 | X | | Dresden | |
| 02 | | D371C | X | | Darmstadt | |
| 02 | | 89879 | X | | Dresden | |
| 02 | | A2F2 | X | | Frankfurt a. Main | |
| 02 | | 25741 | X | | Walldorf | |
| 02 | | EB0E | X | | Walldorf | |
| 02 | | F307C | X | | waldorf | |
| 01 | | 62A9E | X | | Hamburg | |
| 02 | | BE50 | X | | | |
| 02 | | 30C59 | X | | Hamburg | |
| 02 | | 4CEB | X | | Dresden | |
| 02 | | 48BE | X | | Hamburg | |
| 02 | | 26D28 | X | | Frankfurt a. Main | |
| 02 | | 7BA9 | X | | Stuttgart | |
| 02 | | 63CA | X | | Hamburg | |
| 02 | | 46A5E | X | | Aachen | |
| 02 | | 46EFCDD4C0EF | | | Triberg | |
| 02 | | 46EFCE46C0EF | | | Viersen | |
| 02 | | 46A6 | X | | | |
| 02 | | 46A6 | X | | | |
| 02 | | 46A6 | X | | Aachen | |
| 02 | | 46A6 | X | | | |
| 02 | | 46A6 | X | | | |
| 02 | | 46A6 | X | | | |
| 02 | | 46A6 | X | | | |

Data Quality Administration Task: Deduplication of OECD - Create Cleansing Cases

◀ Back | 💾 Save | ✕ Cancel | ↻  ⬛ Back ▾ ☐

▼ Step Details    ✏ Edit  Start                                                           ✎ 📦

Step  Create Cleansing Cases                   Start Automatically ☐

Task Type  Integrated Duplicate Check          Validation Group  OECD

Variant Desc.  Variant Int. Duplicate Check    Status  Completed

▼ Key Performance Indicator                                                  📦 ✎ ⬛

| Job Name | Job No. | Start Date | Start Time | KPI Description | KPI Value |
|---|---|---|---|---|---|
| DQA-0000000669-S05 | 17444400 | 05.03.2008 | 17::4 | Number of cleansing cases | 34 |
| DQA-0000000669-S05 | 17444400 | 05.03.2008 | 17::4 | Number of inconsistent cases | 69 |
| DQA-0000000669-S05 | 17444400 | 05.03.2008 | 17::4 | Number of creation failures | 0 |
| DQA-0000000669-S05 | 17444400 | 05.03.2008 | 17::4 | Validation group size | 783 |

▼ Job Monitor                                                                 📦 ✎ ⬛

Cancel

| Job ID | Job Name | Created By | Job Status | Start Date | Start Time | Periodic | Planned ... | Planned ... | End Time | Spool Exi... |
|---|---|---|---|---|---|---|---|---|---|---|
| 17444400 | DQA-00000006... | D038632 | Finished | 05.03.2008 | 17::4 | No | 05.03.2008 | 17::4 | 17::4 | No |

▼ Application Log  Decrease Level of Detail  Increase Level of Detail          📦 ✎ ⬛

| Mess... | Leve... | Message Text | Time Stamp |
|---|---|---|---|
| | 3 | Cleansing Case 0000001506 created | 05.03.2008 16:44:45 |
| | 3 | Account 0000400056 added to Cleansing Case 0000001506 | 05.03.2008 16:44:45 |

602 — 604 — 606

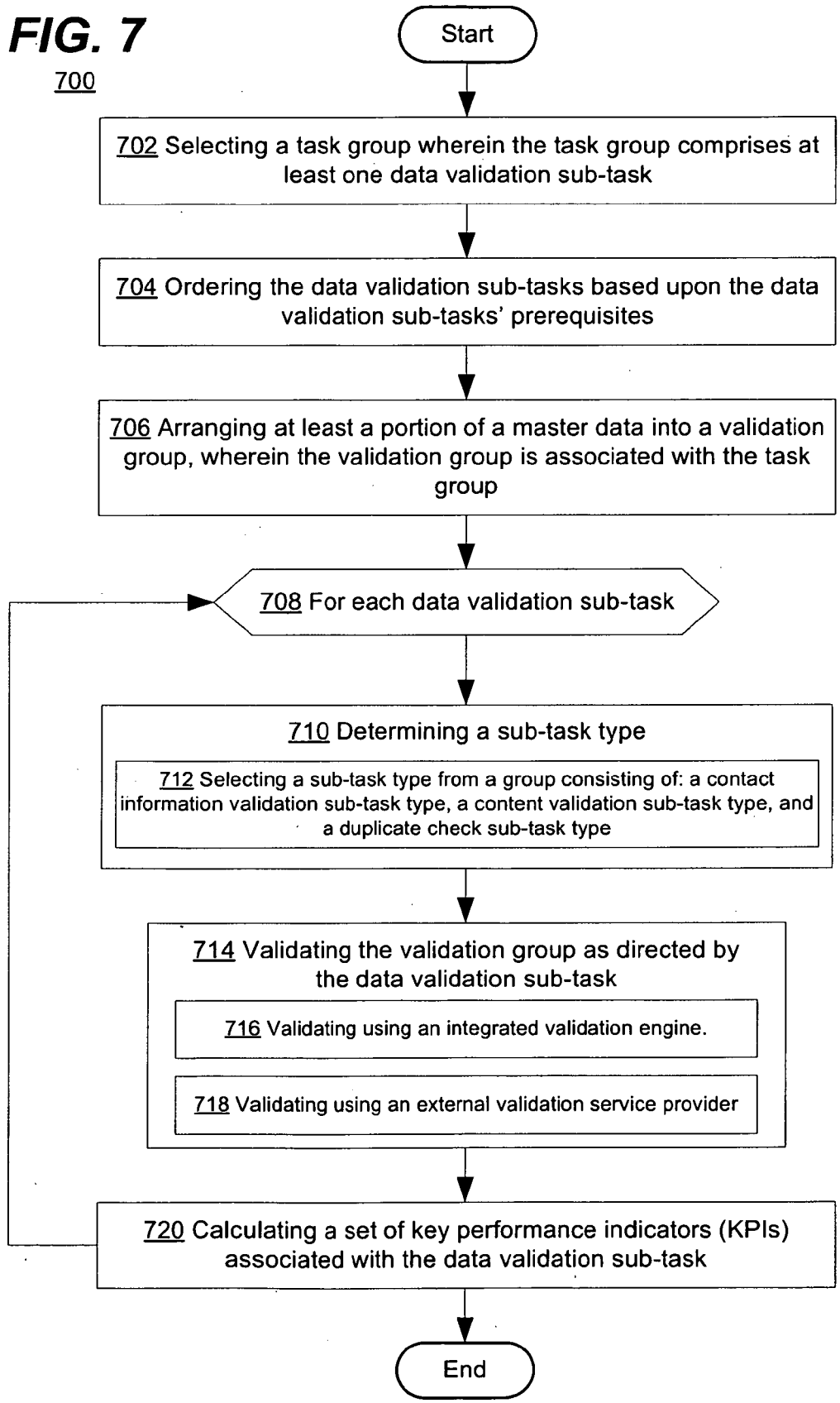

_US 8,606,762 B2_

DATA QUALITY ADMINISTRATION FRAMEWORK

TECHNICAL FIELD

This description relates to data quality management and more specifically to the automation of data quality management.

BACKGROUND

Many companies and organizations store and use massive amounts of data. This data is often critical to the success of the organization. As a result, data quality is a major issue in all companies. Incorrect data, duplicates, invalid addresses, etc. often create high costs and difficulties for an organization. The manual process to clean-up a database is typically expensive and time consuming. Frequently the process requires knowledge about the business partners or people whose data is stored in the database.

Customer relationship management (CRM) is typically the practice of intelligently finding, marketing to, selling to, and servicing customers. Frequently, CRM includes the capture, storage, and analysis of information relating to customers, vendors, partners, and/or internal systems. Often a user may wish to search for specific information within the captured information.

SUMMARY

According to one general aspect, a method of data quality management including selecting a task group wherein the task group comprises at least one data validation sub-task. In one embodiment, the method may also include arranging at least a portion of a master data into a validation group, wherein the validation group is associated with the task group. In various embodiments, the method may include, for each data validation sub-task, determining a sub-task type, validating the validation group as directed by the data validation sub-task, and calculating a set of key performance indicators (KPIs) associated with the data validation sub-task.

According to another general aspect, a data quality manager including a central control manager, a sub-task classifier, at least one validation engine, and a key performance indicator (KPI) calculator. In various embodiments, the central control manager may be configured to acquire a validation group comprising at least a portion of a set of master data configured to store customer relationship management data, and acquire a task group, associated with the validation group, indicating a set of data validation sub-tasks to be performed using the validation group. In some embodiments, the a sub-task classifier may be configured to determine, for each sub-task of the task group, a sub-task type, and determine, for each sub-task and based upon the sub-task type, which validation engine to use to validate the validation group according to the respective data validation sub-task. In various embodiments, the validation engine(s) may be configured to for at least a subset of the data validation sub-tasks, validate the validation group according to the data validation sub-task. In various embodiments, the key performance indicator (KPI) calculator may be configured to calculate a set of KPIs associated with the data validation sub-task, and provide the KPIs to a data validation user interface.

According to another general aspect, machine readable medium including instructions capable of being executed by at least one machine, wherein the instructions, when executed, cause the machine to perform the following action. In various embodiments, the instructions may include instructions configured to select a task group wherein the task group comprises at least one data validation sub-task. In one embodiment, the instructions may include instructions configured to arrange at least a portion of a master data into a validation group, wherein the validation group is associated with the task group. In some embodiments, the instructions may include instructions configured to, for each data validation sub-task, determine a sub-task type, validate the validation group as directed by the data validation sub-task, and calculate a set of key performance indicators (KPIs) associated with the data validation sub-task.

The details of one or more implementations are set forth in the accompanying drawings and the description below. Other features will be apparent from the description and drawings, and from the claims.

A system and/or method for managing information, substantially as shown in and/or described in connection with at least one of the figures, as set forth more completely in the claims.

BRIEF DESCRIPTION OF THE DRAWINGS

FIG. 3 is a diagram of an example embodiment of a file in accordance with the disclosed subject matter.

FIG. 6 is a user interface diagram produced by an example embodiment of a system in accordance with the disclosed subject matter.

FIG. 7 is a flow chart of an example embodiment of a technique in accordance with the disclosed subject matter.

DETAILED DESCRIPTION

Figure 1:
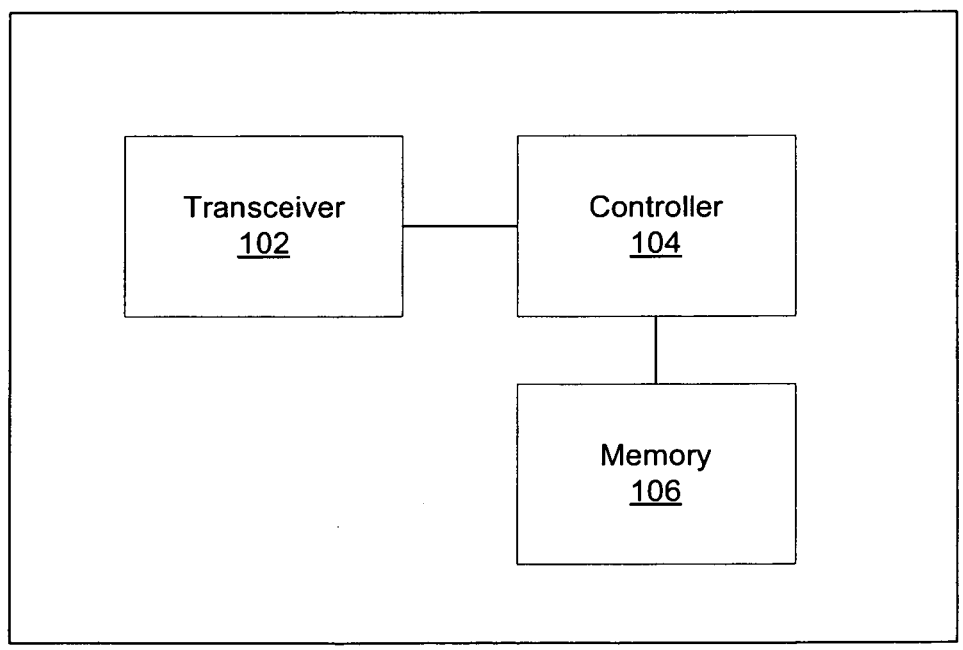
FIG. 1 is a block diagram of an example embodiment of an apparatus in accordance with the disclosed subject matter.
Figure 2:
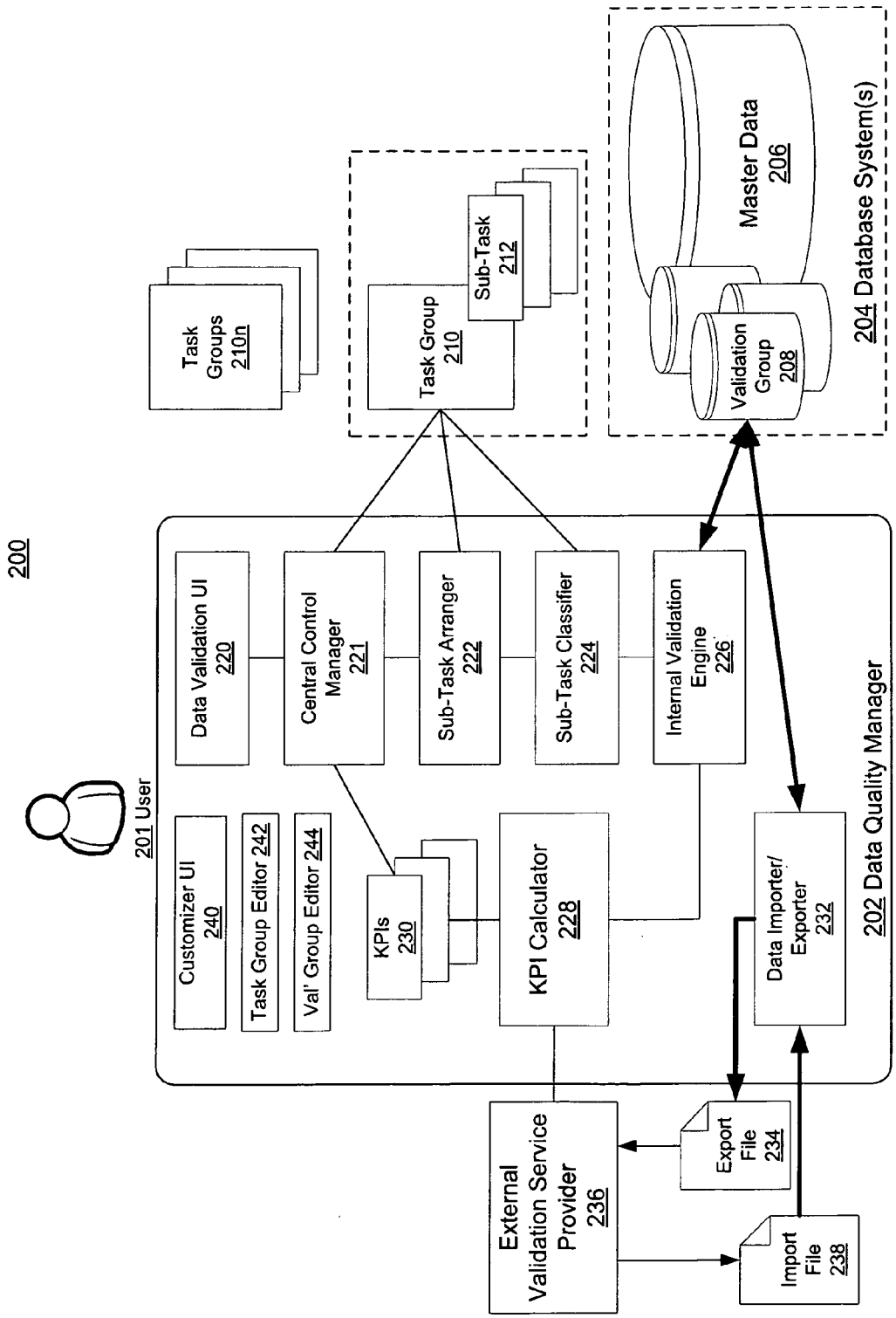
FIG. 2 is a block diagram of an example embodiment of a system in accordance with the disclosed subject matter.

Referring to the Figures in which like numerals indicate like elements, FIG. 1 is a block diagram of a device 100 in accordance with an example embodiment of the disclosed subject matter. In one embodiment, the device 100 may include a data management system such as illustrated in FIG. 2. In one embodiment, the device 100 may include a transceiver 102, a controller 104, and a memory 106. In various embodiments, the controller 104 may include a processor. In various embodiments, the transceiver 102 may be configured to communicate via at least one networking standard (e.g., WiFi, WiMAX, Ethernet, etc.). In various embodiments, the memory 106 may include permanent (e.g., compact disc, etc.), semi-permanent (e.g., a hard drive, etc.), or temporary (e.g., volatile random access memory, etc.) memory. For example, some operations illustrated and/or described herein, may be performed by a controller 104, under control of software, firmware, or a combination thereof. In another example, some components illustrated and/or described herein, may be stored in memory 106.

FIG. 2 is a block diagram of an example embodiment of a system 200 in accordance with the disclosed subject matter. In various embodiments, the system 200 may include a data quality manager 202, a database system 204, and at least one task group 210 and 210n. In some embodiments, the system 200 may also include an external validation service provider 236. In other embodiments, the external validation service provider 236 may be part of another system. In various embodiments, the system 200 may be controlled or used by a user 201.

In various embodiments, the database system 204 may be configured to store customer relationship management data. In some embodiments, the database system 204 may include a plurality of servers, one of which may, in one embodiment, include the data quality manager 202. In various embodiments, the database system 204 may include a set of master data 206. In various embodiments, this master data 206 may include a database or databases of customer relationship management data. In various embodiments, such data may include the names, addresses, buying habits, etc. of various business partners or clients, for example. In this context, the term "business partner" will be used to represent any individual, person (actual or legal), business, organization, client, etc. whose information is stored in the master data 206.

In various embodiments, the master data 206 may include a plurality of records. Ideally the master data 206 would include a one-to-one relationship between business partners and records, such that each business partner includes one record. It is understood that it is expected that the master data 206 may not be in an ideal state and therefore in need of the service provided by the data quality manager 202, as described below. In various embodiments, each record may include a plurality of fields. In various embodiments, each field may include data regarding a specific type of information (e.g., address, postal code, phone number, name, etc.). In various embodiments (e.g., a spreadsheet), the records may be thought of a rows, and the fields as columns.

In various embodiments, the master data 206 may be logically divided or apportioned into validation groups 208. In various embodiments, each validation group 208 may include a subset of the master data 206. In some embodiments, the validation groups 208 may overlap and include records or fields that are also included in other validation groups. In various embodiments, the validation groups 208 may be copies of data from the master data 206. Whereas, in another embodiment, the validation groups 208 may simply be logical groupings, possibly implemented as filters, of the master data 206.

In various embodiments, a user 201 may have created validation groups 208 based upon common features of the data included in the validation group 208. For example, a European validation group may exist that includes only records pertaining to European business partners; likewise, an Asian validation group or an American validation group may also exist. In another embodiment, validation groups 208 may exist based upon a time based component (e.g., records added or changed within the last month, etc.). In yet another embodiment, validation groups 208 may exist based upon the business group or groups of the users 201 using the data quality manager 202. In various embodiments, a number of validation groups 208 may exist based upon whatever criteria a user 201 finds convenient or desirable. It is understood that the above are merely a few illustrative examples to which the disclosed subject matter is not limited.

In various embodiments, the system 200 may also include at least one task group 210 or 210n. In some embodiments, the task group 210 may be configured to indicate at least one data validation sub-task 212 to be performed by the data quality manager 202 on the data within a given validation group 208.

In various embodiments, each task group 210 may be associated with a validation group 208.

For example, in one embodiment, a task group 210 may be associated with a validation group 208 that includes only data from or associated with America. The task group 210 may include data validation sub-tasks 212 (also referred to simply as "sub-tasks") that dictate that the postal addresses of each record of the validation group 208 be checked for accuracy. In another embodiment, a task group 210 may be associated with a validation group 208 that includes data that has changed in the last month. The task group 210 may include sub-tasks 212 that dictate that each record of the validation group 208 is to be checked for duplications and proper formatting. In various embodiments, the task groups 210 may be used to flexibly define a plurality of data quality management tasks to be performed on various sub-sets of the master data 206 (as defined by various validation groups 208). It is understood that the above are merely a few illustrative examples to which the disclosed subject matter is not limited. Examples of various embodiments of these tasks and sub-tasks are described in more detail below.

In various embodiments, a sub-task 212 may include a pre-defined set of instructions to be performed or applied to a validation group 208. In some embodiments, each sub-task 212 may include a plurality of smaller more atomic steps or instructions. In one embodiment, a sub-task 212 may include a set of configurable parameters or variants. In various embodiments, some or all of these parameters may be inherited from the task group 210. In such an embodiment, the task group 210 may include a set of parameters or variants that may act as default values for each sub-task 212. In such an embodiment, these parameters may dictate or control how a sub-task 212 is to be performed, as described in more detail below.

In various embodiments, each sub-task 212 may include a sub-task type. In such an embodiment, the sub-task type may indicate what data quality operation results from the sub-task 212 and may dictate the set of instructions found in the sub-task 212. In another embodiment, the sub-task type may indicate what validation engine (e.g., internal validation engine 226, external validation service provider 236, etc.) is to be used to perform the sub-task 212. In such an embodiment, a validation engine or service provider may be specialized in performing a certain type or types of data quality management, as described below.

In various embodiments, the system 200 may include a data quality manager 202. In various embodiments, the data quality manager 202 may be configured to improve or attempt to improve the quality of the data stored in the set of master data 206. In various embodiments, the data quality manager 202 may operate in a non-blocking way, such as, in the background, so that a user 201 or other program or part of a program may continue to operate without being dependent upon the data quality manager 202. In one embodiment, the data quality manager 202 may be configured to process multiple task groups 210 substantially simultaneously. In some embodiments, the data quality manager 202 may monitor or restrict access to any validation groups 208 that are currently being improved to assure data coherency (e.g., by making the validation group 208 read-only, delaying writes to the validation group 208, etc.).

In some embodiments, the data quality manager 202 may include a data validation user interface (UI) 220. In various embodiments, the data validation UI 220 may be configured to provide an interface for a user 201 to control and monitor various data quality tasks (e.g., task groups 210). In various embodiments, the data validation UI 220 may provide an interface for a user 201 to select a task group 201 (which is associated with a validation group 208) to be performed by the data quality manager 202. In one embodiment, the data validation UI 202 may provide a display of the results and/or status of the task group 210 and sub-tasks 212 as they are being processed by the data quality manager 202. In another embodiment, these results may be represented in whole or part as a set of key performance indicators (KPIs) 230, as described below.

In various embodiments, the data quality manager 202 may include a central control manager 221. In some embodiments, the central control manager 221 may be configured to acquire a selected task group 210 and the validation group 208 associated with the task group 210. In one embodiment, the central control manager 221 may also be configured to monitor the processing of the task group 210, control the processing of the task group 210, and report the status of the task group 210 and the validation group 208 to the data validation UI 202.

In various embodiments, the data quality manager 202 may include a sub-task arranger 222. In one embodiment, the sub-task arranger 222 may be configured to dynamically arrange the sub-tasks 212 of the selected task group 210. In another embodiment, the sub-task arranger 222 may be configured to use a predefined sub-task arrangement found within the task group 210.

In various embodiments, the sub-task arranger 222 may be configured to determine if any sub-tasks 212 are prerequisites for other sub-tasks 212. As an example, in one embodiment, a sub-task 212 or a more atomic instruction dictating the generation of cleansing cases of duplicate records to be removed may be a prerequisite to a sub-task 212 or a more atomic instruction dictating that all cleansing cases are to be removed from the validation group 208; however, it is understood that the above is merely one illustrative example to which the disclosed subject matter is not limited. In such an embodiment, the sub-task arranger 222 may be configured to arrange the sub-tasks 212 such that the prerequisite sub-tasks 212 are performed prior to their respective dependent sub-tasks 212.

In various embodiments, the sub-task arranger 222 may be configured to determine if any sub-tasks 212 may be performed in parallel. In one embodiment, the sub-task arranger 222 may be configured to arrange the sub-tasks 212 to facilitate the parallel performance or processing of the sub-tasks 212. For example, in one embodiment, a first sub-task may cause the validation group 208 to be checked for duplicate records. A second sub-task may cause the validation group 208 to be checked for proper formatting of the fields of the records. In one embodiment, the results of these two sub-tasks may be substantially merged if they are performed in parallel. However, it is understood that the above is merely one illustrative example to which the disclosed subject matter is not limited.

In one embodiment, the sub-task arranger 222 may be configured to arrange the timing of the performance of sub-tasks 212 between task groups 210. For example, in one embodiment, two task groups may involve validation groups 208 that overlap or include some of the same records from the master data 206. In such an embodiment, if the data quality manager 202 is attempting to execute these two task groups at the same time, or in an substantially simultaneous fashion, the sub-task arranger 222 may be configured to order and arrange the two task groups various sub-tasks in order to reduce or minimize any data access or coherency issues.

In one embodiment, the data quality manager 202 may include a sub-task classifier 224. In various embodiments, the sub-task classifier 224 may be configured to, for each sub-task 212 of a task group 210, determine the sub-task type of the sub-task 212. In various embodiments, the sub-task type of each sub-task 212 may dictate which validation engine is used to perform the sub-task 212.

In various embodiments, the sub-tasks 212 may include one of a plurality of sub-task types. In some embodiments, the types may include: a contact information validation task type, a content validation task type, or a duplicate check task type, etc.; although, it is understood that the above are merely a few illustrative examples to which the disclosed subject matter is not limited. In addition, in various embodiments, each of these sub-tasks types may include internal or external type variations (e.g., external duplication check task type, etc.). In one embodiment, the internal or external type variation may indicate whether the sub-task is to be performed or executed in whole or part by an internal validation engine 226 or an external validation engine (e.g., external validation service provider 236). In some embodiments, an internal validation engine 226 may also be referred to as an integrated validation engine.

In one embodiment, a contact information validation task type of a sub-task 212 may include some or all of the following instructions or steps. In one embodiment, the sub-task 212 may include an instruction for validating the syntax of a set of contact information included in each record of a validation group 208. In various embodiments, the contact information may include a postal address, a telephone number, email address, etc. In one embodiment, the sub-task 212 may include an instruction for validating the spelling of the set of contact information included in the record. Although, it is understood that the above are merely a few illustrative examples to which the disclosed subject matter is not limited.

In one embodiment, a content validation task type of a sub-task 212 may include some or all of the following instructions or steps. In one embodiment, the sub-task 212 may include an instruction for validating the existence of a business partner represented by the record of a validation group 208. As described above, in this context, the term "business partner" will be used to represent any individual, person (actual or legal), business, organization, client, etc. who's information is stored in the master data 206. In one embodiment, the sub-task 212 may include an instruction for validating that the business partner has a location that is reachable at the contact information included in the record. In one embodiment, the sub-task 212 may include an instruction for validating a selected set of other information included in the record. Although, it is understood that the above are merely a few illustrative examples to which the disclosed subject matter is not limited.

In one embodiment, a duplicate check task type of a sub-task 212 may include some or all of the following instructions or steps. In one embodiment, the sub-task 212 may include an instruction for determining if a record within the validation group is substantially equivalent to any other record in the validation group. In one embodiment, the sub-task 212 may include an instruction for generating a cleansing case, indicating that the record and the record's substantial equivalent record are effectively duplicates. In one embodiment, the sub-task 212 may include an instruction for automatically merging the effectively duplicate records to a single record.

In one embodiment, a sub-task 212 that includes an external version of a sub-task type may include some or all of the following instructions or steps. In one embodiment, the sub-task 212 may include an instruction for exporting a file (e.g., export file 234) in a pre-defined format that includes the records or data of the validation group 208. In one embodiment, the sub-task 212 may include an instruction for initiating the external validation service provider to validate and update the data included in the exported file. In one embodiment, the sub-task 212 may include an instruction for waiting for the external validation service provider 236 to finish validating the information. However, in various embodiments, the data quality manager 202 may be configured to not wait or block operations while the external validation service provider 236 is processing the data. In one embodiment, the sub-task 212 may include an instruction for acquiring a validated file (e.g., import file 238), produced by the external validation service provider 236, that includes updated portions of the data. In one embodiment, the sub-task 212 may include an instruction for importing, from the file, at least the updated portions of the information into the validation group 208. Although, it is understood that the above are merely a few illustrative examples to which the disclosed subject matter is not limited.

In one embodiment, a sub-task 212 may include a type or instruction to automatically create or acquire a validation group 208. In such an embodiment, the validation group 208 may be generated using a predefined filtering operation from the master data 206. This may be contrasted with manually created validation groups 208. In various embodiments, a validation group creation type of sub-task 212 may be associated with a profile. In various embodiments, a profile may be a set of parameters that may be associated with a task group 210 or sub-tasks 212. The use of a profile may reduce the effort of a user 201 to configure the parameters for a plurality of task groups 210. In various embodiments, such a validation group creation type of sub-task 212 may be the first sub-task 212 performed in a task group 210, because of the need for a known validation group 208 by other sub-tasks 212. In such an embodiment, the task group 210 may be associated with a dynamically created validation group 208, as opposed to a pre-defined validation group 208.

In various embodiments, the sub-task 212 may include a set of configurable parameters or variants, as described above. In one embodiment, these parameters may indicate or dictate how various instructions or operations may be executed. For example, in one embodiment, a parameter may indicate the format for an export file to an external validation service provider. In another embodiment, a parameter may indicate the address (e.g., a unique identifier, a URL, etc.) of an external validation service provider. In yet another embodiment, a parameter may indicate an authorization value (e.g., username, password, etc.) to use when accessing a validation engine. In one embodiment, a parameter may indicate the key performance indicators (KPIs) expected to be reported as a result of processing the sub-task 212. Although, it is understood that the above are merely a few illustrative examples to which the disclosed subject matter is not limited.

In various embodiments, the sub-task classifier 224 or the central control manager 221 may route or assign the sub-task 212 to the proper validation engine (e.g., internal validation engine 226, external validation service provider 236, etc.) based, at least in part, upon the sub-task type of the sub-task 212. In various embodiments, the sub-task classifier 224 or the central control manager 221 may dynamically create an instantiation of the proper validation engine.

In one embodiment, the data quality manager 202 may include at least one integrated or internal validation engine 226. In various embodiments, the internal validation engine 226 may be configured to validate the validation group 208 according to the data validation sub-task 212. In one embodiment, the validation engine 226 may be configured to only process sub-tasks 212 of one given type. For example, in various embodiments, a first validation engine 226 may exist to process the duplicate check type of sub-tasks 212. A second validation engine (not shown) may exist to process the contact information validation type of sub-tasks 212. A third validation engine (e.g., external validation service provider 236) may exist to process the content validation type of sub-tasks 212. In various embodiments, the validation engines may be differentiated by other features (e.g., parameters used to judge the quality of data, geographical handling, etc.). One such example is discussed below in referred to external validation service provider 236. Although, it is understood that the above are merely a few illustrative examples to which the disclosed subject matter is not limited.

In one example embodiment, the internal validation engine 226 may be configured to process the duplicate check type of sub-tasks 212. In such an embodiment, the internal validation engine 226 may search the records of the validation group 208 for records that are substantially equivalent, and therefore duplicates. In various embodiments, the criteria used to judge whether or not two or more records are substantially equivalent may be pre-configured or adjustable via an administrator interface or the sub-task 212 parameters. In such an embodiment, the internal validation engine 206 may automatically merge duplicate records (once again according to a set of criteria) or delete duplicate record, leaving a unique record in the validation group 208. In various embodiments, the internal validation engine 226 may be configured to update the validation group 208 or master data 206 as a result of processing the sub-task 212.

In various embodiments, an internal validation engine 226 may be configured as an add-on or plug-in and use a common predefined interface to interact with the data quality manager 202 or the central control manager 221. In such an embodiment, internal validation engines may be created by various parties (e.g., a user 201, the data quality manager creator, a third-party, etc.) and plugged-in or integrated with the data quality manager 202.

In various embodiments, the data quality manager 202 may include a data importer/exporter 232. In some embodiments, the data importer/exporter 232 may be configured to operate when a sub-task 212 is to be executed, in whole or part, by an external validation service provider 236. In various embodiments, the data import/exporter 232 may be configured to export data from the validation group 208 to a predetermined export file 234. In various embodiments, the data import/exporter 232 or the central control manager 221 may be configured to initiate the external validation service provider 236 to validate and update the data included in the exported file. In various embodiments, the data import/exporter 232 may be configured to, upon completion of the external validation service provider 236, acquire a validated import file 238, produced by the external validation service provider 236, that includes any updated portions of the data. In one embodiment, the data import/exporter 232 may be configured to import, from the import file 238, at least the updated portions of the data into the validation group 208 or master data 206.

As described above, in various embodiments, various external validation service providers 236 may be used and each may provide different abilities and features. For example, if contact information is being validated, a first external validation service provider 236 may be capable of validating American postal codes and telephone numbers. Whereas, a second external validation service provider (not shown) may be capable of validating British postal codes and telephone numbers. In such an embodiment, the Data Importer/Exporter 232 or central control manager 221 may be configured to determine which external validation service provider to interact with. In various embodiments, this may be indicated by a parameter, as described above.

In various embodiments, the format of the export file 234 may be predetermined or indicated by a parameter, as described above. In another embodiment, the export file 234 format may be indicated by the external validation service provider 236 selected. In various embodiments, the file formats may include Extensible Markup Language (XML), Comma Separated Values (CSV), proprietary formats, a series of remote procedure calls (RPCs), plain text, etc.; although, it is understood that the above are merely a few illustrative examples to which the disclosed subject matter is not limited. In various embodiments, the export file 234 may be generated on the same system as the data quality manager 202, the databases system 204, transmitted to the system that includes the external validation service provider 236, stored in a common area, etc.

In various embodiments, the format of the import file 238 may be predetermined and/or indicated by a parameter, as described above. In some embodiments, the file format may be based upon the format used for the export file 234. In other embodiments, the format of the import file 238 may be predefined and identical regardless of the generating external validation service providers 236. In such an embodiment, a re-formatting engine (not shown) may be used to convert the import file 238 from an unacceptable file format to the predefined acceptable format. In various embodiments, the re-formatting engine may be included as part of the data importer/exporter 232.

In various embodiments, the import file 238 may include a plurality of records. In one embodiment, each record may include an "action code" field that indicates an action to be taken when merging the import file 238 with the validation group 208. In some embodiments, the action code field value may indicate one of the four actions: take no action, create a record, change a record, delete a record; although, it is understood that the above are merely a few illustrative examples to which the disclosed subject matter is not limited.

FIG. 3 is a diagram of an example embodiment of an import file 300 in accordance with the disclosed subject matter. In various embodiments, the import file 300 may include a plurality of records or columns and a plurality of fields or rows associated with each record. In one embodiment, the import file 300 may include an action code field or row 302. In such an embodiment, the action code field may include a value for each record indicating an action to be taken when merging the import file 300 with the validation group 208. In such an embodiment, the code "00" or null may indicate that no action is to be taken. In one embodiment, the code "01" may indicate that a record should be created in the validation group 208. In one embodiment, the code "02" may indicate that a record should be changed in the validation group 208. In one embodiment, the code "03" may indicate that the record should be deleted from the validation group 208. Although, it is understood that the above are merely a few illustrative examples to which the disclosed subject matter is not limited.

Returning to FIG. 2, in various embodiments, the import file 238 may include a plurality of records. In one embodiment, each record may include a "cleansing case" field that indicates which records are substantially equivalent. In various embodiments, the data importer/exporter 232 may be configured to simply delete all but one of the records of a given cleansing case when merging the import file 238 with the validation group 208. In another embodiment, the data importer/exporter 232 may be configured to merge the different records of a cleansing case into a single record before merging the import file 238 with the validation group 208. In another embodiment, the external validation service provider 236 may merge the records, and indicate the surviving record via an action code, as described above. In various embodiments, the criteria used to merge the records may be predefined (e.g., copy non-null values to fields with null values, etc.) or configurable, as described above.

Figure 4:
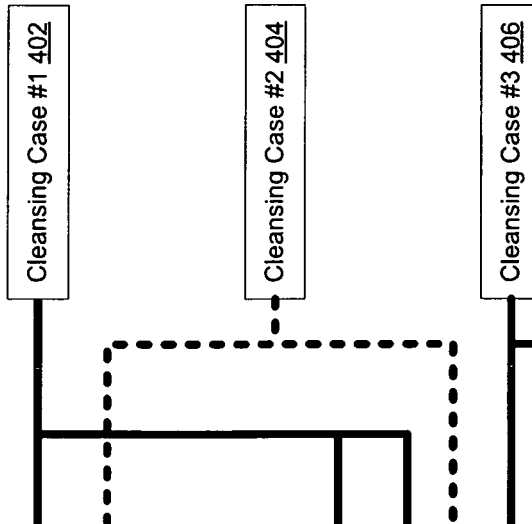
FIG. 4 is a diagram of an example embodiment of a file in accordance with the disclosed subject matter.

FIG. 4 is a diagram of an example embodiment of an import file 400 in accordance with the disclosed subject matter. In various embodiments, the import file 400 may include a plurality of records or columns and a plurality of fields or rows associated with each record. In one embodiment, the import file 400 may include an action code field or row 408. In various embodiments, the value of the cleansing case field 408 may indicate which cleansing case group, if any, the record belongs to. In some embodiments, a null value may indicate that the record is considered unique.

In one embodiment, the import file 400 may include three cleansing cases 402, 404, and 406. Records 410, 412, and 414, included within cleansing case #1 402, may be marked with the value "1" in their respective cleansing case fields 408. Records 420 and 422, included within cleansing case #2, 404 may be marked with the value "2" in their respective cleansing case fields 408. Records 430 and 432, included within cleansing case #3, 406 may be marked with the value "3" in their respective cleansing case fields 408. Although, it is understood that the above are merely a few illustrative examples to which the disclosed subject matter is not limited.

Returning to FIG. 2, in various embodiments, the data quality manager 202 may include a key performance indicator (KPI) calculator 228. In various embodiments, the KPI indicator 228 may be configured to calculate a set of KPIs 230 associated with the data validation sub-task 212 or task group 210. In one embodiment, the KPI calculator 228 may be configured to provide the KPIs 230 to the data validation user interface 220 and/or the central control manager 221.

In various embodiments, the KPIs 230 may include a subset of performance indicators from a larger measurable set of performance indicators. In some embodiments, the selection of the performance indicators may be predefined. In another embodiment, the selection of the performance indicators may be configurable via the sub-task 212 parameters, as described above. In various embodiments, the KPI calculator 228 may be configured to calculate the number of records in the validation group 208, determine the data verification sub-task 212 performed, calculate the number of records marked as needing correction, and calculate a number of records corrected, etc.; although, it is understood that the above are merely a few illustrative examples to which the disclosed subject matter is not limited.

In various embodiments, these KPIs or a subset thereof may be displayed or made available via the data validation UI 220, as described below. In various embodiments, the data validation UI 220 may include a button or other interface to allow a user 201 to examine and/or approve the changes to the validation group 208 before committing the changes to the master data 206. In another embodiment, the changes may be automatically committed or written to the master data 206, as described above.

In various embodiments, the data quality manager 202 may include a customizer UI 240. In one embodiment, the customizer UI 240 may be configured to provide a first user interface element with which a user 201 may create a task group 210. In another embodiment, the customer UI 240 may be configured to provide a second user interface element with which a user 201 may edit a task group 210 and the sub-tasks 212 of the task group 210. In yet another embodiment, the customizer UI 240 may be configured to provide a third user interface element with which a user 201 may edit a validation group 208. In various embodiments, the customizer UI 240 may be used by a user 201 to edit and create various validation task groups 210, associated sub-tasks 212 and validation groups 208.

Figure 8:
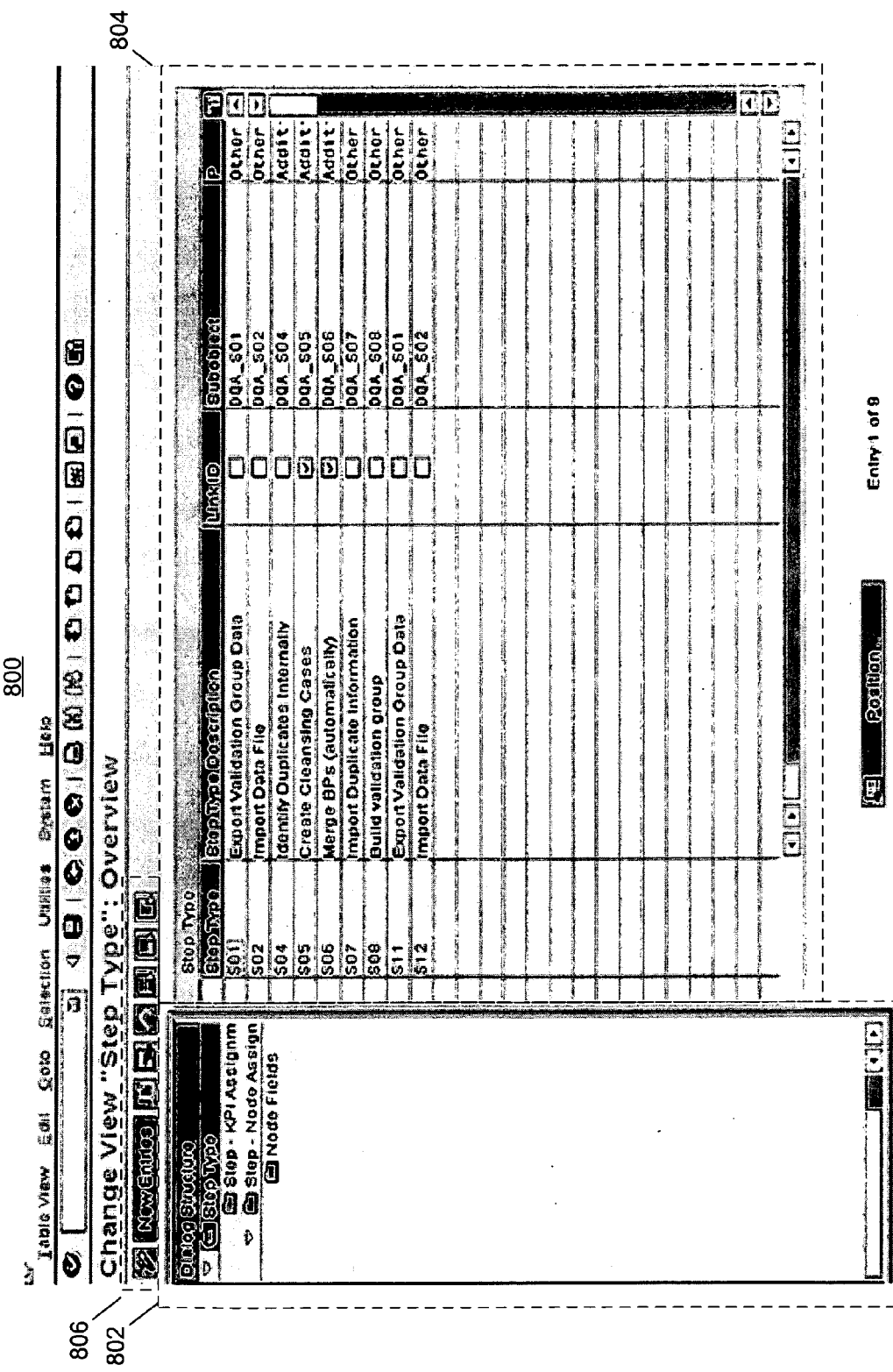
FIG. 8 is a user interface diagram produced by an example embodiment of a system in accordance with the disclosed subject matter.

FIG. 8 is a user interface diagram produced by an example embodiment of a system in accordance with the disclosed subject matter. In various embodiments, the customizer UI 240 of FIG. 2 may include a UI 800. In one embodiment, the UI 800 may include a first UI element 802 configured to allow a user to or facilitate a user's editing of a task group. In one such embodiment, a user may add, delete, or change sub-tasks assigned to a task group. In one embodiment, the UI 800 may include a second UI element 804 configured to allow a user to or facilitate a user's editing of sub-tasks associated with or assigned to a task group, as described above. In various embodiments, the UI 800 may include a third UI element 806 configured to facilitate the performance of common actions, or expected actions via a reduced number of user operations. In various embodiments, the customizer UI 240 of FIG. 2 may include a plurality of UIs, as described above; although, it is understood that the above is merely one illustrative example to which the disclosed subject matter is not limited.

In various embodiments, the data quality manager 202 may include a task group editor 242. In various embodiments, the task group editor 242 may be configured to create, edit and/or delete task groups 210 and, likewise, with any associated sub-tasks 212. In various embodiments, the task group editor 242 may be configured to perform these operations based upon input received via the customer UI 240.

In various embodiments, the data quality manager 202 may include a validation group editor 244. In various embodiments, the validation group editor 244 may be configured to create, edit and/or delete validation groups 208 and associate the validation groups 208 with task groups 210. In various embodiments, the validation group editor 244 may be configured to perform these operations based upon input received via the customer UI 240.

Figure 5:
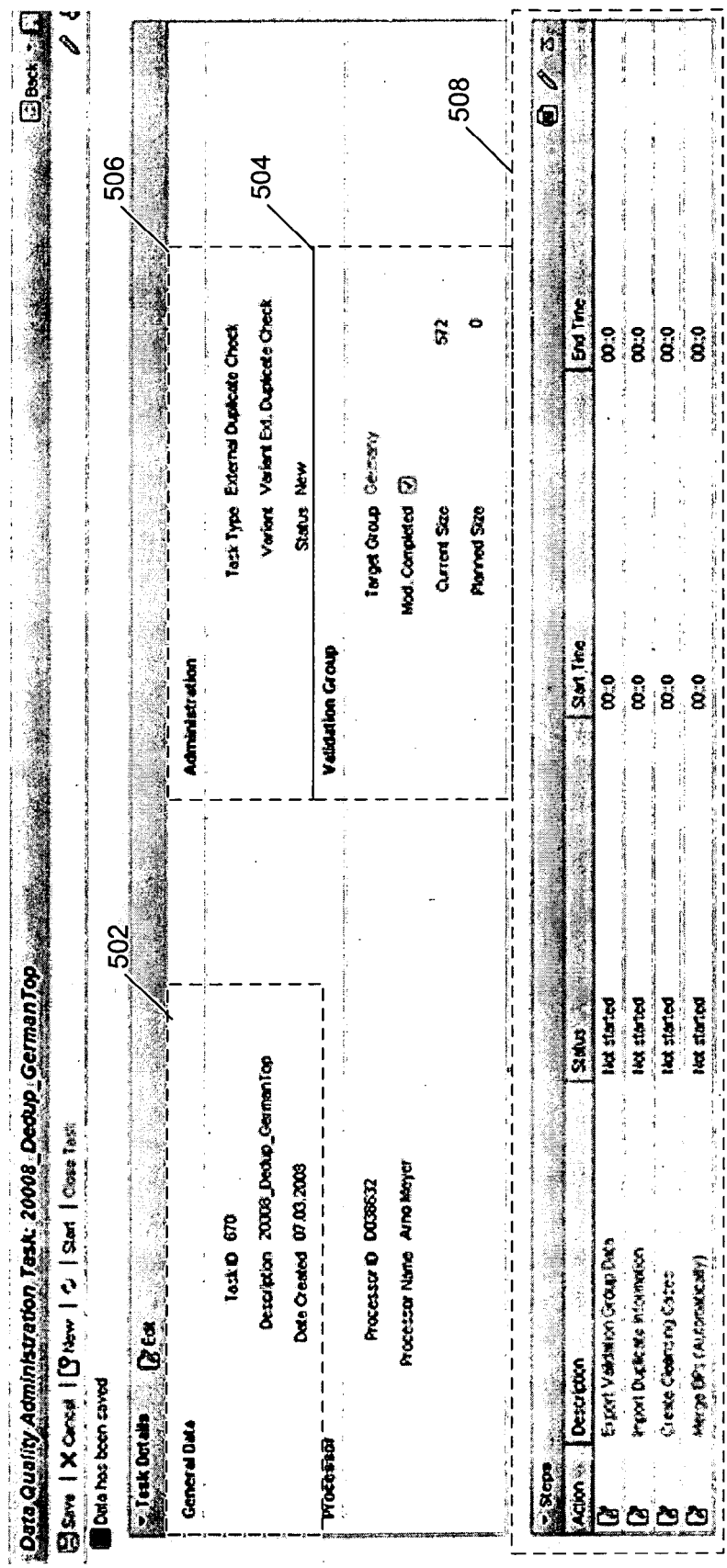
FIG. 5 is a user interface diagram produced by an example embodiment of a system in accordance with the disclosed subject matter.

FIG. 5 is a user interface diagram produced by an example embodiment of a system in accordance with the disclosed subject matter. In various embodiments, the user interface 500 may be included as part of the data validation UI 220 of FIG. 2. In one embodiment, the UI 500 may include an UI element 502 configured to display the task group or sub-task general description (e.g., identifier (ID), explanative description, title, etc.). In another embodiment, the UI 500 may include a UI element 504 configured to display validation group information (e.g., title, number of records, status, associated task group, etc.). In various embodiments, the UI 500 may include a UI element 506 configured to display the active sub-task (e.g., the sub-task type, variant, parameters, status, etc.). In some embodiments, the UI 500 may include a UI element 508 configured to display the status of the more atomic steps of instructions of the active sub-task (e.g., level of completion, processing time, etc.).

FIG. 6 is a user interface diagram produced by an example embodiment of a system in accordance with the disclosed subject matter. In various embodiments, the user interface 600 may be included as part of the data validation UI 220 of FIG. 2. In one embodiment, the UI 600 may include an UI element 602 configured to display details about a given or selected more atomic instruction or step of a selected sub-task (e.g., instruction name, sub-task type, parameters, validation group, status, etc.). In various embodiments, the UI 600 may include a UI element 604 configured to display the KPIs associated with the instruction or sub-task (e.g., processing time, number of records processed, status of the records, etc.).

In some embodiments, the UI 600 may include a UI element 606 configured to display a detailed description of the processing of an instruction or sub-task (e.g., information messages, warnings, errors, etc.).

FIG. 7 is a flow chart of an example embodiment of a technique 700 in accordance with the disclosed subject matter. In various embodiments, parts or all of the technique 700 may be the results of the operations of the system 200 of FIG. 2 or system 100 of FIG. 1. Although, it is understood that other systems and timing diagrams may produce technique 700.

Block 702 illustrates that, in one embodiment, a task group may be selected, as described above. In various embodiments, the task group may include at least one data validation sub-task, as described above. In various embodiments, the action described above may be performed by the controller 104 of FIG. 1 or the central control manager 221 of FIG. 2, as described above.

Block 704 illustrates that, in one embodiment, the data validation sub-tasks may be ordered based upon the data validation sub-tasks' prerequisites, as described above. In various embodiments, ordering may include determining if any data validation sub-tasks are prerequisites for other data validation sub-tasks. In one embodiment, ordering may further include, if a sub-task is a prerequisite for another sub-task arranging the data validation sub-tasks such that the prerequisite data validation sub-tasks are performed prior to their respective dependent sub-tasks, as described above. In various embodiments, ordering may include determining if any data validation sub-tasks may be performed in parallel and if so, arranging the data validation sub-tasks to facilitate the parallel performance of the sub-tasks, as described above. In various embodiments, the actions described above may be performed by the controller 104 of FIG. 1, the sub-task arranger 222 or the central control manager 221 of FIG. 2, as described above.

Block 706 illustrates that, in one embodiment, at least a portion of a master data may be arranged into a validation group, as described above. In various embodiments, the validation group may be associated with the task group, as described above. In some embodiments, the validation group may be dynamically created, as described above. In another embodiment, the validation group may be predefined (e.g., via a customization user interface), as described above. In one embodiment, the validation group may include a plurality of customer relationship management (CRM) records, as described above. In various embodiments, the actions described above may be performed by the controller 104 of FIG. 1, or the central control manager 221 of FIG. 2, as described above.

Block 708 illustrates that, in one embodiment, the following actions may occur for each sub-task of the task group, as described above. In various embodiments, the following actions mat only occur for a portion of the sub-tasks, as described above.

Block 710 illustrates that, in one embodiment, a sub-task type may be determined, as described above. Block 712 illustrates that, in one embodiment, determining may include selecting a sub-task type from a group consisting of: a contact information validation sub-task type, a content validation sub-task type, and a duplicate check sub-task type, as described above. In various embodiments, determining may include determining a set of preconfigured settings for each data validation sub-task, as described above. In some embodiments, the set of preconfigured settings may include various parameters, such as, a sub-task type for the data validation sub-task, whether or not the data validation sub-task is to be performed using an external validation service provider, a file format used to export information to the external validation service provider, a file format used to import information from the external validation service provider, a list of key performance indicators to be calculated as a result of the data validation sub-task, etc., as described above. Although, it is understood that the above are merely a few illustrative examples to which the disclosed subject matter is not limited. In various embodiments, the actions described above may be performed by the controller 104 of FIG. 1, the sub-task classifier 224 or the central control manager 221 of FIG. 2, as described above.

Block 714 illustrates that, in one embodiment, the validation group may be validated as directed by the data validation sub-task, as described above. Block 716 illustrates that, in one embodiment, validating may include using an integrated validation engine, as described above. Block 718 illustrates that, in one embodiment, validating may include using an external validation service provider, as described above. In various embodiments, the actions described above may be performed by the controller 104 of FIG. 1, the internal validation engine 226 or the external validation service provider 236 of FIG. 2, as described above.

In various embodiments, involving an external validation service provider, validating may include exporting data from the validation group to a predetermined file, as described above. In some embodiments, validating may also include initiating the external validation service provider to validate and update the data comprised in the exported file, as described above. In one embodiment, validating may include acquiring a validated file, produced by the external validation service provider, that comprises any updated portions of the data, as described above. In various embodiments, validating may include merging, from the file, at least the updated portions of the data into the validation group, as described above. In various embodiments, the file may include an action code field indicating an action to be taken when merging the file with the validation group, as described above. In other embodiments, the file may include a cleansing case field indicating which records are substantially equivalent, as described above. In various embodiments, the actions described above may be performed by the transceiver 102 or controller 104 of FIG. 1, or the data importer/exporter 232 or the external validation service provider 236 of FIG. 2, as described above.

In various embodiments, validating may include determining, based in part upon the data validation sub-task, a set of conditions that indicate the quality of a record under test. In some embodiments, validating may include testing at least a portion of each record to determine if the record conforms to the set of conditions, as described above. In one embodiment, validating may include if a record fails testing, indicating that the record is faulty, as described above. In such an embodiment, validating may include, if a record fails the test, indicating at least one remedial measure to take to correct the record, as described above. In various embodiments, the actions described above may be performed by the controller 104 of FIG. 1, the internal validation engine 226 or the external validation service provider 236 of FIG. 2, as described above.

In various embodiments, validating may include, if the data validation sub-type task comprises a contact information validation sub-task type, for each record of the validation group, validating the syntax of a set of contact information comprised in the record and/or validating the spelling of the set of contact information, as described above. In various embodiments, the actions described above may be performed by the controller 104 of FIG. 1, the internal validation engine 226 or the external validation service provider 236 of FIG. 2, as described above.

In various embodiments, validating may include, if the data validation sub-type task comprises content validation sub-task type, for each record of the validation group, validating the existence of a business partner represented by the record, as described above. In such an embodiment, validating may also include validating that the business partner has a location at a set of contact information comprised in the record, as described above. In one embodiment, validating may further include validating a selected set of other information comprised in the record, as described above. In various embodiments, the actions described above may be performed by the controller 104 of FIG. 1, the internal validation engine 226 or the external validation service provider 236 of FIG. 2, as described above.

In various embodiments, validating may include, if the data validation sub-type task comprises duplication checking sub-task type, for each record of the validation group, determining if the record is substantially equivalent to any other record in the validation group, as described above. In such an embodiment, validating may also include, if the record is not sufficiently unique, generating a cleansing case, indicating that the record and the record's substantial equivalent record(s) are effectively duplicates, as described above. In some embodiments, validating may further include automatically merging the effectively duplicate records to a single record, as described above. In various embodiments, the actions described above may be performed by the controller 104 of FIG. 1, the internal validation engine 226 or the external validation service provider 236 of FIG. 2, as described above.

Block 720 illustrates that, in one embodiment, a set of key performance indicators (KPIs) which are associated with the data validation sub-task may be calculated, as described above. In various embodiments, calculating may include calculating the number of records in the validation group, as described above. In some embodiments, calculating may include determining the data verification sub-task performed, as described above. In other embodiments, calculating may include calculating a number of records marked as needing correction, as described above. In yet another embodiment, calculating may include calculating a number of records corrected, as described above. In various embodiments, the actions described above may be performed by the controller 104 of FIG. 1 or the KPI calculator 228 of FIG. 2, as described above.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A method of data quality management comprising:
    selecting, by a processor of a data quality manager device, a task group wherein the task group comprises at least one data validation sub-task including a set of configurable parameters for controlling execution of the at least one data validation sub-task;
    arranging at least a portion of a master data, stored by a memory of a database device, into a validation group, wherein the validation group is associated with the task group; and
    for each data validation sub-task:
        determining a sub-task type of the data validation sub-task,
        validating the validation sub-task based upon the sub-task type of the data validation sub-task, and
        calculating a set of key performance indicators (KPIs) associated with the data validation sub-task.

2. The method of claim 1 further comprising selecting a sub-task type from a group consisting of:
    a contact information validation sub-task type;
    a content validation sub-task type; and
    a duplicate check sub-task type.

3. The method of claim 1 further comprising determining a set of preconfigured settings for each data validation sub-task; and
    wherein the set of preconfigured settings comprises:
        a sub-task type for the data validation sub-task;
        whether or not the data validation sub-task is to be performed using an external validation service provider; and
        at least one of the following:
            file format used to export information to the external validation service provider, and
            a file format used to import information from the external validation service provider a list of key performance indicators to be calculated as a result of the data validation sub-task.

4. The method of claim 1 wherein the validation group comprises a database of business records; and
    wherein validating comprises:
        determining, based in part upon the data validation sub-task, a set of conditions that indicate the quality of a record under test,
        testing at least a portion of each record to determine if the record conforms to the set of conditions, and
        if a record fails testing, indicating that the record is faulty.

5. The method of claim 4 wherein validating further comprises:
    if a record fails the test, indicating at least one remedial measure to take to correct the record.

6. The method of claim 1 wherein the validation group comprises a database of business records; and
    wherein validating comprises, if the data validation sub-task type comprises a contact information validation sub-task type, for each record of the validation group:
        validating a syntax of a set of contact information comprised in the record, and
        validating a spelling of the set of contact information.

7. The method of claim 1 wherein the validation group comprises a database of business records; and
    wherein validating comprises, if the data validation sub-task type comprises a content validation sub-task type, for each record of the validation group:
        validating an existence of a business partner represented by the record,
        validating that the business partner has a location at a set of contact information comprised in the record, and
        validating a selected set of other information comprised in the record.

8. The method of claim 1 wherein the validation group comprises a database of business records; and
    wherein validating comprises, if the data validation sub-task type comprises a duplication checking sub-task type, for each record of the validation group:
        determining if a record is substantially equivalent to any other record in the validation group, if so, generating a cleansing case, indicating that the record and the record's substantial equivalent record(s) are effectively duplicates, and automatically merging the effectively duplicate records to a single record.

9. The method of claim 1 wherein validating comprises:

determining, based upon a sub-task type, whether or not the validation is to be performed by an external validation service provider; and if so, exporting data from the validation group to a predetermined file, initiating the external validation service provider to validate and update the data comprised in the exported data file, acquiring a validated file, produced by the external validation service provider, that comprises any updated portions of the data, and merging, from the file, at least the updated portions of the data into the validation group.

10. The method of claim 9 wherein merging comprises:

importing a file that comprises a plurality of records, each record comprising an action code field indicating an action to be taken when merging the file with the validation group, wherein the action comprises an action selected from a group comprising:

no action, create a record, change a record, delete a record; and if the sub-task associated with the file comprises a duplicate check sub-task type, importing a file that comprises for each record a cleansing case field indicating which records are substantially equivalent.

11. The method of claim 1 wherein calculating comprises:

calculating a number of records in the validation group;

determining a data verification sub-task performed;

calculating a number of records marked as needing correction; and calculating a number of records corrected.

12. The method of claim 1 further comprising:

determining if any data validation sub-tasks are prerequisites for other data validation sub-tasks;

if so, arranging the data validation sub-tasks such that the prerequisite data validation sub-tasks are performed prior to their respective dependent sub-tasks;

determining if any data validation sub-tasks may be performed in parallel; and if so, arranging the data validation sub-tasks to facilitate the parallel performance of the sub-tasks.

13. A data quality manager comprising:

a memory configured to:

store at least a portion of a validation group comprising at least a portion of a set of master data, and store at least a portion of a task group, associated with the validation group, indicating a set of data validation sub-tasks to be performed using the validation group, each data validation sub-task including a set of configurable parameters for controlling execution of each data validation sub-task;

a processor configured to:

determine, for each data validation sub-task which validation engine to use to validate the validation group according to a sub-task type of the respective data validation sub-task;

at least one validation engine configured to:

for at least a subset of the data validation sub-tasks, validate the validation group according to the data validation sub-task; and a key performance indicator (KPI) calculator configured to:

calculate a set of KPIs associated with the data validation sub-task, and provide the KPIs to a data validation user interface.

14. The data quality manager of claim 13 further comprising a data validation user interface configured to provide a first user interface element with which a user can select a task group to use for data quality management; and display the results of the data validation sub-tasks of the task group.

15. The data quality manager of claim 13 wherein each data validation sub-task comprises a sub-task type from a group consisting of: a contact information validation sub-task type; a content validation sub-task type; and a duplicate check sub-task type.

16. The data quality manager of claim 13 wherein the validation group comprises at least a portion of a database of records; and wherein the at least one validation engine comprises a contact information validation engine specifically configured to provide contact information validation; and wherein the contact information validation engine is configured to, for each record of the validation group: validate a syntax of a set of contact information comprised in the record, and validate the spelling of a set of contact information.

17. The data quality manager of claim 13 wherein the validation group comprises at least a portion of a database of records; and wherein the at least one validation engine comprises a content validation engine specifically configured to provide content validation; and wherein the content validation engine is configured to:

validate an existence of a business partner represented by the record, validate that the business partner has a location at a set of contact information comprised in the record, and validate a selected set of other information comprised in the record.

18. The data quality manager of claim 13 wherein the validation group comprises at least a portion of a database of records; and wherein the at least one validation engine comprises a duplication checking validation engine specifically configured to provide duplication validation; and wherein the duplication checking validation engine is configured to: determine if a record is substantially equivalent to any other record in the validation group, if so, generate a cleansing case, indicating that the record and the record's substantial equivalent record(s) are effectively duplicates, and automatically merge the effectively duplicate records to a single record.

19. The data quality manager of claim 13 wherein the processor is configured to determine whether or not the validation is to be performed by an external validation service provider;

wherein the data quality manager comprises a data importer/exporter configured to:

export data from the validation group to an export file, merge, from an import file produced by the external validation service provider, at least the updated portions of the data into the validation group; and wherein the processor is configured to:

cause the external validation service provider to validate and update the data comprised in the export file.

20. The data quality manager of claim 19 wherein data importer/exporter is configured to:

import an import file that comprises a plurality of records, each record comprising an action code field indicating an action to be taken when merging the file with the validation group, wherein the action comprises an action selected from a group comprising:

no action, create a record, change a record, delete a record; and if the sub-task type associated with the file comprises a duplicate check sub-task type, import an import file that comprises for each record a cleansing case field indicating which records are substantially equivalent.

21. The data quality manager of claim 13 further comprising a sub-task arranger configured to:

determine if any data validation sub-tasks are prerequisites for other data validation sub-tasks;

if so, arrange the data validation sub-tasks such that the prerequisite data validation sub-tasks are performed prior to their respective dependent sub-tasks;

determine if any data validation sub-tasks may be performed in parallel; and if so, arrange the data validation sub-tasks to facilitate the parallel performance of the sub-tasks.

22. A machine readable medium comprising instructions being tangibly and non-transitorily embodied and capable of being executed by at least one machine, wherein the instructions, when executed, cause the machine to:

select a task group wherein the task group comprises at least one data validation sub-task including a set of configurable parameters for controlling execution of the at least one data validation sub-task;

arrange at least a portion of a master data into a validation group, wherein the validation group is associated with the task group; and for each data validation sub-task:

determine a sub-task type of the data validation sub-task, validate the validation sub-task based upon the sub-task type of the data validation sub-task, and calculate a set of key performance indicators (KPIs) associated with the data validation sub-task.

\* \* \* \* \*